(12) United States Patent
Ruona

(10) Patent No.: US 7,415,819 B2
(45) Date of Patent: Aug. 26, 2008

(54) METHOD AND SYSTEM TO AUTOMATICALLY DRAIN AND DISPOSE OF ACCUMULATED WATER FROM WATER/FUEL SEPARATORS IN DIESEL

(75) Inventor: William C. Ruona, Farmington Hills, MI (US)

(73) Assignee: Ford Global Technologies, LLC., Dearborn, MI (US)

( * ) Notice: Subject to any disclaimer, the term of this patent is extended or adjusted under 35 U.S.C. 154(b) by 0 days.

(21) Appl. No.: 11/152,298

(22) Filed: Jun. 14, 2005

(65) Prior Publication Data
US 2006/0277899 A1  Dec. 14, 2006

(51) Int. Cl.
*F01N 3/00*  (2006.01)

(52) U.S. Cl. .............. 60/286; 60/274; 60/301; 60/303

(58) Field of Classification Search ............ 60/274, 60/285, 286, 297, 301, 303, 311
See application file for complete search history.

(56) References Cited

U.S. PATENT DOCUMENTS

| | | | |
|---|---|---|---|
| 2,880,079 A | 3/1959 | Cornelius | |
| 3,886,738 A | 6/1975 | Sien | |
| 4,637,351 A | 1/1987 | Pakula | |
| 5,078,901 A | 1/1992 | Sparrow | |
| 5,193,340 A * | 3/1993 | Kamihara | 60/286 |
| 5,207,990 A * | 5/1993 | Sekiya et al. | 422/183 |
| 5,272,874 A | 12/1993 | Paas | |
| 5,534,161 A | 7/1996 | Tarr et al. | |
| 6,514,404 B1 | 2/2003 | Bauer | |

\* cited by examiner

*Primary Examiner*—Thomas Denion
*Assistant Examiner*—Diem Tran

(57) ABSTRACT

A method and system are provided for removing water/fuel mixture from a water/fuel separator. The method injects the water/fuel mixture is injected into an exhaust aftertreatment device where the fuel portion of such mixture is burned and converted into water and carbon dioxide. The water/fuel mixture is injected as a dose, the timing of the injection being a function of the temperature of exhaust gas from the engine.

5 Claims, 1 Drawing Sheet

METHOD AND SYSTEM TO AUTOMATICALLY DRAIN AND DISPOSE OF ACCUMULATED WATER FROM WATER/FUEL SEPARATORS IN DIESEL

TECHNICAL FIELD

This invention relates in general to an automotive type diesel engine fuel filter, and more particularly to one in which water is automatically drained and disposed of within a portion of the engine.

BACKGROUND

As is known in the art, the use of water separators in diesel engine fuel filters is a well-known expedient to rid the oil of materials that might cause a degradation of engine performance. Many of these consist merely of a water drainage reservoir at the bottom of the fuel filter connected by a drain tube simply to the ground or possibly to a container. Some are automatically operable; others, not. For example, some contain sensors activated when the water reaches a predetermined level in the reservoir to energize a signal light located on the dashboard of the vehicle to warn the driver of the need to drain the filter. Others include electrical means to operate a solenoid valve to automatically open the drain to a discharge pipe. In most cases, the drain is simply a drain to ground.

The inventors herein have recognized a disadvantage with the prior art approaches. Namely, inventors recognized that the material collected in the separator contains a water/fuel mixture, wherein the fuel portion of the mixture may be used to reduce fuel consumption and improve emission control of the engine. In particular, the mixture may be burned in an exhaust aftertreatment device thus increasing its temperature and the temperature of any downstream exhaust aftertreatment devices. Additionally, the fuel in the water/fuel mixture may be used as reductant to reduce NOx in a NOx-reducing aftertreatment device, such as an active lean NOx catalyst (ALNC).

SUMMARY

In accordance with the present invention, a method and system are provided for removing water/fuel mixture from a water/fuel separator used in an internal combustion engine. The method injects the water/fuel into hot exhaust gases of the engine where the fuel portion of such mixture is burned and converted into water and carbon dioxide.

In one embodiment, the water/fuel mixture is passed to an exhaust aftertreatment device.

In one embodiment, the temperature of the exhaust is measured and wherein the water/fuel mixture is introduced into the aftertreatment device when the measured temperature exceeds a predetermined temperature.

In one embodiment, the water/fuel mixture is stored in a separator and wherein the level of the water in the separator is determined and wherein the water/fuel mixture is introduced into the aftertreatment device when the determined level exceeds a predetermined level.

In one embodiment, the water/fuel mixture is introduced into the aftertreatment device as a function of the measured temperature and the determined level.

In one embodiment, the aftertreatment device is an oxidizing catalyst.

In accordance with another feature of the invention, a method is provided for removing water/fuel mixture from a water/fuel separator of a diesel engine. The method includes passing the water/fuel mixture to an oxidizing exhaust aftertreatment device of such engine and wherein the oxidation of the contaminated water/fuel mixture generates an exothermic reaction for such device.

In accordance with another feature of the invention, the aftertreatment device is a diesel particulate filter or an oxidation catalyst. In one embodiment, the exothermic reaction is used to assess the aftertreatment device's functionality for emission diagnostics.

In one embodiment the water/fuel mixture is fed to the aftertreatment device through an air assisted injector.

In accordance with yet another feature of the invention a method is provided for removing water/fuel mixture from a water/fuel separator of a diesel engine. The method includes passing the water/fuel mixture to a lean burn exhaust aftertreatment device of such engine and adjusting an amount of reduction injection into the device on an amount of reductant in the water/fuel mixture.

In accordance with still another feature of the invention, a method is provided comprising injecting a water/fuel mixture into hot exhaust gas of an internal combustion engine, such injection being in a region between the engine and an exhaust aftertreatment device.

In accordance with another feature of the invention, a system is provided for removing water/fuel mixture from a water/fuel separator of diesel engine. The system includes an injector fed by water/fuel mixture in a fuel/water separator, such injector having an outlet disposed in an exhaust region of the engine. An exhaust aftertreatment device is disposed downstream of the exhaust region. A temperature sensor is disposed in the exhaust region A controller is provided for activating the injector in response to signal from the temperature sensor indicating the temperature in the exhaust region exceed a predetermined temperature, wherein said predetermined temperature is a temperature above which exothermic reaction occurs in the exhaust aftertreatment device. Upon such activation the injector injects a portion of the water/fuel mixture into the exhaust region.

The details of one or more embodiments of the invention are set forth in the accompanying drawings and the description below. Other features, objects, and advantages of the Invention will be apparent from the description and drawings, and from the claims.

DESCRIPTION OF DRAWINGS

Like reference symbols in the various drawings indicate like elements.

DETAILED DESCRIPTION

Figure 1:
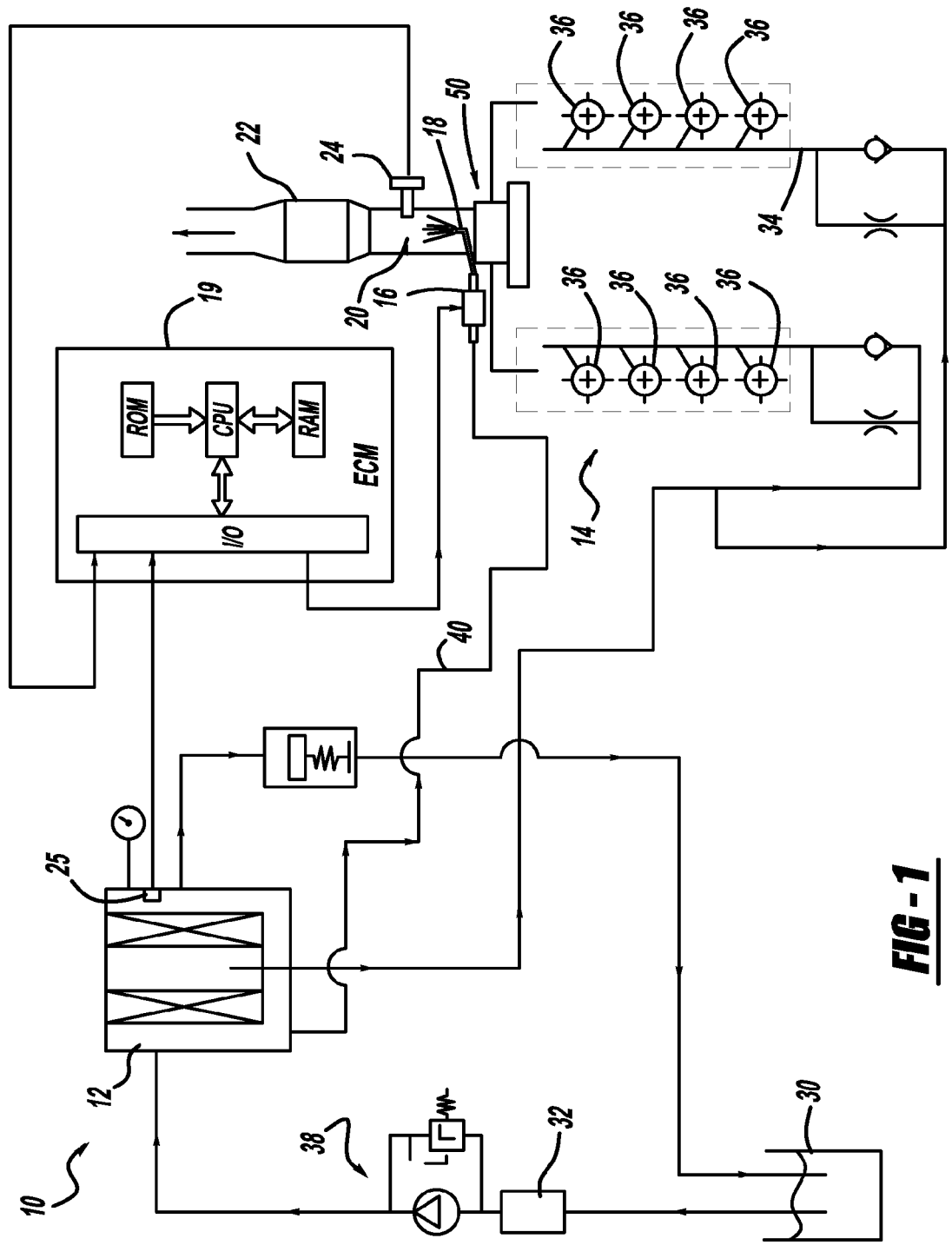
FIG. 1 is a schematic diagram of an engine 4 and an emission control system wherein the invention is used to advantage.

Referring now to FIG. 1, a system 10 is provided for removing material, here contaminated water/fuel mixture which accumulates in a water/fuel separator 12 of a diesel engine 14. An exhaust aftertreatment device 22 is disposed downstream of the exhaust region 20. The system 10 also included an injector 16 used to supply reductant to device 22. Here, the injector 16 is a air assisted injector, such as that described in copending U.S. patent application Ser. No. 10/301296, filed Nov. 21, 2002, assigned to the same assignee as the present invention, the subject matter thereof being incorporated herein by reference. Reductant may be supplied to injector 16 from a fuel tank or from a separate storage vessel (neither shown). Injector 16 is also fed by the water/ fuel mixture in a fuel/water separator 12 An exhaust gas temperature (EGT) sensor 24 is disposed in the exhaust region 20. A controller 26, here a engine control module (ECM) is provided for activating the injector 16 in response to a signal from the temperature sensor 24 indicating the temperature in the exhaust region 20 exceed a predetermined temperature, here, for example, a temperature above which exothermic reaction occurs in the aftertreatment device 22. Upon such activation, the injector 16 injects a portion of the water/fuel mixture stored in the separator 12 into the exhaust region 20 to be delivered to device 22. Here, the water/fuel mixture, is electronically injected as a dose, the quantity of the material in such dose being a function of the temperature of exhaust gas from the engine. Thus, the injection is in a region between the engine 14 and an exhaust aftertreatment device 22.

More particularly, here the water/fuel mixture is injected when the level of the water in the separator 12, measured by a water in filter (WIF) sensor 25, exceeds a predetermined level and when the temperature in the exhaust region 20 exceeds the predetermined temperature.

Thus, when the temperature in the exhaust region 20 exceeds the predetermined temperature, the injected fuel is oxidized, i.e., burned in aftertreatment device 22, and is thereby converted into water and carbon dioxide.

Thus, system 10 provides a water/fuel disposal system for the water/fuel separator 12. The disposal method includes injecting the water/fuel mixture into hot exhaust gas and burning it in the exhaust aftertreatment device. The burning in turn converts the waste into $H_2O$ and $CO_2$.

System 10 combines six subsystems: The controller 22, e.g., an Electronic control module (ECM) having an I/O section, RAM. CPU and ROM arranged in a convention manner as shown. Here the ROM is a semiconductor chip storing an executable computer program for effecting the process described above. Also included is the water in filter sensor (WIF) 25; the Exhaust Gas Temperature Sensor (EGT) 24; and atomization device, here the injector 16; and the aftertreatment device 22, such as, for example, oxidation catalyst. Alternatively, aftertreatment device 22 may be a diesel particulate filter (DPF). Alternatively, aftertreatment device may be an active lean NOx catalyst (ALNC).

Fuel in the fuel tank 30 is fed through a fuel strainer 32 to fuel rails 34 of the engine cylinders 36 via the fuel/water separator 12 by a mechanical vane transfer and priming pump, 38, as shown. Excess fuel in the separator 12 is returned to the tank by any conventional means. The water/fuel portion in the separator 12 is fed to the injector 16 via conduit 40, as shown. Conduit 40 contains a pressurizing/metering device (not shown) for delivery of the water/fuel mixture to injector 16.

The WIF 25 sensor sends a continuous signal to the ECM 12 indicating the level of water in water/fuel separator 12. The ECM 12 also continuously monitors exhaust gas temperature (EGT). When specified conditions are met (i.e., the water level is above a predetermined level and the EGT is above the predetermined level, i.e. temperature above which exothermic reaction occurs in aftertreatment device), the ECM 22 commands the injector 16 to inject the water/fuel mixture into the exhaust stream external of the engine 14, here downstream of a turbocharger 50 for the engine 14.

The water/fuel mixture is then burnt (i.e., oxidized) over the aftertreatment device, 22, thus raising the temperature of the device. Alternatively, water/fuel mixture may be constantly drawn from the water/fuel filter 12. The reductant in the removed water/fuel mixture may be added to the reductant supplied to injector 16 from the fuel tank or a separate container as described above. The reductant supplied to the injector may be a hydrocarbon reductant. For example, in an embodiment wherein device 22 is an ALNC, such an arrangement would provide extra reductant for NOx conversion, and thus demand for reductant from the fuel tank or a separate container may be reduced. This results in improvements in engine fuel efficiency.

The method included injecting a reductant into the material prior to passing such material to the lean burn exhaust aftertreatment device of such engine wherein oxidation in the aftertreatment device generates an exothermic reaction in such device.

A number of embodiments of the invention have been described. Nevertheless, it will be understood that various modifications may be made without departing from the spirit and scope of the invention. Accordingly, other embodiments are within the scope of the following claims.

What is claimed is:

1. A method for removing material from a water/fuel separator of a diesel engine, said engine having a NOx-reducing catalyst coupled downstream of it, comprising:
   injecting material from the water/fuel separator into the NOx-reducing catalyst; and
   adjusting an amount of reductant injected into the NOx-reducing catalyst based on an amount of reductant contained in said material.

2. The method recited in claim 1 wherein an amount of the water/fuel mixture injected into said catalyst is a function of a temperature of exhaust gas from the engine.

3. The method recited in claim 2 the water/fuel mixture is introduced into said catalyst when said temperature exceeds a predetermined value.

4. The method recited in claim 2 wherein a level of water in the separator is determined and wherein the water/fuel mixture is introduced into the catalyst when said determined level exceeds a predetermined level.

5. The method recited in claim 3 wherein a level of the water/fuel mixture in the separator is determined and wherein the water/fuel mixture is introduced into the catalyst when said determined level exceeds a predetermined level.

* * * * *